(12) United States Patent
Suzuki et al.

(10) Patent No.: US 6,208,083 B1
(45) Date of Patent: Mar. 27, 2001

(54) SYSTEM AND METHOD FOR DRIVING ORGANIC EL DEVICES

(75) Inventors: Mitsunari Suzuki; Hirotada Furukawa, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/567,063

(22) Filed: May 8, 2000

(30) Foreign Application Priority Data

Sep. 8, 1998 (JP) .................................................. 10-270523

(51) Int. Cl.[7] ........................................................ G09G 3/10

(52) U.S. Cl. .................................. 315/169.3; 315/169.1; 345/102; 345/103; 396/292

(58) Field of Search ............................... 315/169.3, 169.1, 315/169.2; 396/292; 345/36, 45, 76, 98, 100, 102, 103, 104

(56) References Cited

U.S. PATENT DOCUMENTS 5,218,399 * 6/1993 Izumi et al. .......................... 396/292
5,861,863 * 1/1999 Kudo et al. .......................... 345/100
6,016,037 * 1/2000 Kuribayashi et al. ............. 315/169.3

* cited by examiner

Primary Examiner—Haissa Philogene
(74) Attorney, Agent, or Firm—Oblon, Spivak, McClelland, Maier & Neustadt, P.C.

(57) ABSTRACT

An organic EL display driving system which enables even a display with a mixed matrix-and-segment portion to be driven with neither a contrast lowering nor a false light emission phenomenon, and yet which is simple in construction. To achieve this, there is provided a system and method for driving an organic EL display with a mixed matrix-and-segment portion, which includes an organic material-containing organic layer between a scanning electrode and a data electrode. When the scanning electrode and the data electrode are driven, a non-selection time during which no data is displayed is provided after driving the segment portion.

6 Claims, 7 Drawing Sheets

SYSTEM AND METHOD FOR DRIVING ORGANIC EL DEVICES

BACKGROUND OF THE INVENTION

Field of the Invention

The present invention relates to a system and method for driving an organic EL display which is constructed using an organic compound and has applications in the fields of information display panels used on audio equipment, automotive measuring instrument panels, displays for displaying moving images and freeze-frame pictures, household electrical appliances, car and bicycle electrical equipment, etc.

DISCUSSION OF THE BACKGROUND

In recent years, an organic EL device has been intensively studied and put to practical use. The organic EL device is basically built up of a tin-doped indium oxide (ITO) or other transparent electrode, a triphenyldiamine (TPD) or other hole transporting layer laminated on the transparent electrode, an organic light emitting layer formed of a fluorescent material such as an aluminum quinolinol complex ($Alq^3$) and laminated thereon, and a metal electrode (electron injecting electrode) provided on the organic light emitting layer and formed of a material having a low work function, for instance, Mg. Such a device now attracts attention as displays for use on household electrical appliances, car and bicycle electric equipment, etc., because a luminance of as high as several hundred to tens of thousands $cd/m^2$ is obtained at a voltage of about 10 V.

Such an organic EL device has a structure wherein an organic layer such as a light emitting layer is sandwiched between a scanning (common line) electrode that usually provides an electron injecting electrode and a data (segment line) electrode that usually provides a hole injecting electrode (transparent electrode), and formed on a transparent (glass) substrate. Electroluminescent displays are generally broken down into a matrix display wherein scanning electrodes and data electrodes are arranged in a matrix form to display information such as images and characters in the form of an assembly of dots (pixels), and a segment display comprising independently provided display units each having predetermined shape and size.

The segment type display may be driven in a static driving mode where the display units are independently driven. For the matrix display, on the other hand, a dynamic driving mode is used, wherein scanning lines and data lines are usually driven in a time division fashion.

When eyeing a certain scan line (electrode), the matrix display has such construction as shown in FIG. 5 for instance. As depicted in FIG. 5, this matrix display may be considered as being built up of a switching element SW for driving the scanning line (connecting the scanning line to the ground side), a resistance (e.g., a pull-up or switch-on resistance) R for stabilizing the scanning line at a given (power source) potential when switching element SW is at rest, pixels D1, D2, D3, ... or organic EL devices, capacitor components C1, C2, C3, ... connected in parallel with one ends of associated pixels D1, D2, D3, ..., and data lines (electrodes) connected to the other ends of pixels D1, D2, D3, ..., which are not shown in FIG. 5.

In this case, the organic EL devices or pixels are taken as being equivalent to diodes D1, D2, D3, ..., as illustrated, with built-in capacitor components C1, C2, C3, .... When this display is driven in the time division mode, accordingly, a time constant given by each of capacitor components C1, C2, C3, ... and the aforesaid resistance R gives rise to a delay time Td upon returning from a driving pulse Ton by the switching element as typically shown in FIG. 6. This delay time Td is superposed on the driving pulse Ton of the next scan electrode. Although depending on data line conditions, the some pixels at the scanning electrode emits light for this delay time irrespective of being a non-selected pixel. This makes contrast worse or is perceived as anomalous light emission.

As shown in FIG. 7 for instance, when a display having a certain number (n) of scanning lines is driven by driving each scanning lines 1, 2, 3, ..., n, a quiescent time Toff is provided between a certain scanning electrode driving pulse and the next scanning electron driving pulse, so that the delay time Td is absorbed thereby preventing a contrast lowering and anomalous light emission. It is here noted that a period Tr is a flyback or retrace time from the final scanning line n to the first scanning line 1.

Incidentally, a display with a matrix portion 31 coexistent with a segment portion 32 is entrenched, as shown in FIG. 8 as an example. When such a display is driven, these portions may be separately driven. However, if the matrix portion 31 and segment portion 32 can be driven by one single driving means, it is then possible to drive both efficiently with minimal hardware because, for control purposes, a controller, a driving circuit, etc. need be used, only one for each. In this case, the display is dynamically driven in a mixed matrix-and-segment form while one or more of scanning lines are assigned to the segment portion 32 with each segment selected by data line.

As can be seen from FIG. 8, however, the total area of each display device 32a corresponding to one line on the segment portion is usually much larger than the total area of each pixel 31a on one scanning line on the matrix portion 31. This means that such a delay time as previously mentioned differs largely between both portions. Therefore, when the display is simply subjected to dynamic driving at an arbitrarily position (at the second line in the illustrated case) as shown in FIG. 9 as an example, the delay time Td becomes long when the segment portion is driven, with the result that the segment portion emits light when the next line (the third line in the illustrated case) is driven. Consequently, this is perceived as an anomalous light emission phenomenon. It is here noted that while the delay time also occurs at the first line, this is within an allowable range because light is emitted at a contrast ratio of 1/100 or lower. On the other hand, light emitted at the second line is perceived as false light emission because the contrast ratio exceeds 1/100.

SUMMARY OF THE INVENTION

An object of the present invention is to provide an organic EL display driving system which enables even a display with a mixed matrix-and-segment portion to be driven with neither a contrast lowering nor a false light emission phenomenon yet in simple construction.

When the display with a mixed matrix-and-segment portion is driven, the delay time due to a CR component in the driving circuit differs because there is an area difference between both portions, as already explained. For this reason, if the quiescent time corresponding to the matrix is set, it is then impossible to prevent a contrast lowering and an anomalous light emission phenomenon because the delay time at the segment portion is too long. If the quiescent time is set corresponding to the delay time at the segment portion, on the other hand, it is practically difficult to dynamically drive the matrix portion because the quiescent time becomes too long.

Regarding the means for driving such a display, usually, the feedback operation for driving the first driving line from the final driving line is often required to have some transition time. This feedback time is defined as a given non-selection time during which any of scanning and data lines is not driven. By making effective use of this non-selection time as a quiescent time for the segment portion, it is thus possible to prevent a contrast lowering and false light emission with high efficiency. In this regard, it is noted that all driving means have not always a flyback time. For this reason, driving means having no flyback time is provided with one or two or more dummy scanning lines. In this case, the flyback time is defined by a time during which one or more such scanning lines are driven. During flyback, data electrodes are in data-off states.

That is, the above object is achievable by the inventions defined below as (1) to (5).

(1) A system for driving an organic EL display with a mixed matrix-and-segment portion, which comprises an organic material-containing organic layer between a scanning electrode and a data electrode, wherein:

when said scanning electrode and said data electrode are driven, a non-selection time during which no data is displayed is provided after driving said segment portion.

(2) The system for driving an organic EL display according to (1) above, wherein at least one of driving lines on said segment portion is driven while connected to a final driving line on said scanning electrode and said non-selection time is provided after driving said segment portion.

(3) The system for driving an organic EL display according to (1) or (2) above, wherein the total area of said segment portion is larger than the total area of a pixel corresponding to one scanning line on said scanning electrode on said matrix portion.

(4) A method for driving an organic EL display with a mixed matrix-and-segment portion, which comprises an organic material-containing organic layer between a scanning electrode and a data electrode, wherein:

when said scanning electrode and said data electrode are driven, a non-selection time during which no data is displayed is provided after driving said segment portion.

(5) The method for driving an organic EL display according to (4) above, wherein said segment portion corresponding to one scanning line of said scanning electrode is driven while connected to a final driving line on said scanning electrode and said non-selection time is provided after driving said final driving line.

DESCRIPTION OF THE PREFERRED EMBODIMENTS

The present invention provides a system for driving an organic EL display with a mixed matrix-and-segment portion, which comprises an organic material-containing organic layer between a scanning electrode and a data electrode, wherein:

when said scanning electrode and said data electrode are driven, a non-selection time during which no data is displayed is provided after driving said segment portion.

It is preferable that the segment portion is driven as the final driving line of the scanning electrode, and that the non-selection time is provided after the final driving line is driven. Alternatively, it is preferable that the non-selection time is defined by a time during which a dummy, hypothetical driving line is assumed to be driven.

Figure 1:
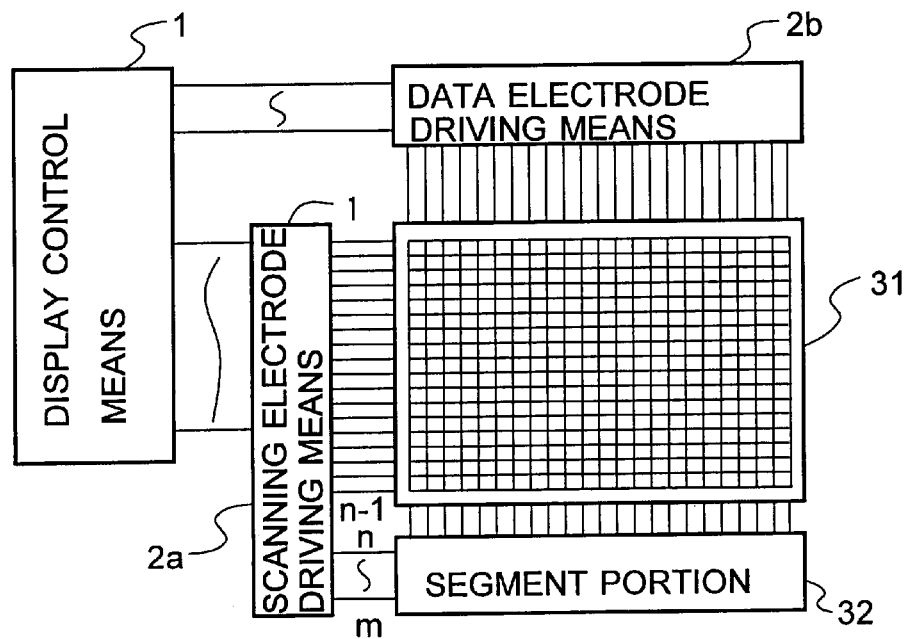
FIG. 1 is a block diagram showing one basic construction of the system for driving an organic EL display according to the present invention.

More illustratively, the driving system of the present invention comprises, as shown in FIG. 1 for instance, display control means 1 for driving the display in a time division fashion, scanning electrode driving means 2a and data electrode driving means 2b for driving the scanning electrode and data electrode of the display in response to a scanning electrode driving signal and a data electrode driving signal from the display control means 1, and a matrix portion 31 and a segment portion 32 of the display. In this driving system, the non-selection time for scanning line flyback is provided after the segment portion 32 is driven as the final line of the scanning electrode. Alternatively, the non-selection time may be defined by driving a dummy scanning line. It is here noted that the data electrode driving means 2b and segment portion 32 may be driven by the same or different driving means. In other words, the same or different control circuit (IC) and control method may be used. The number of the scanning lines corresponding to the segment may be one (n) or plural (n–m).

Figure 2:
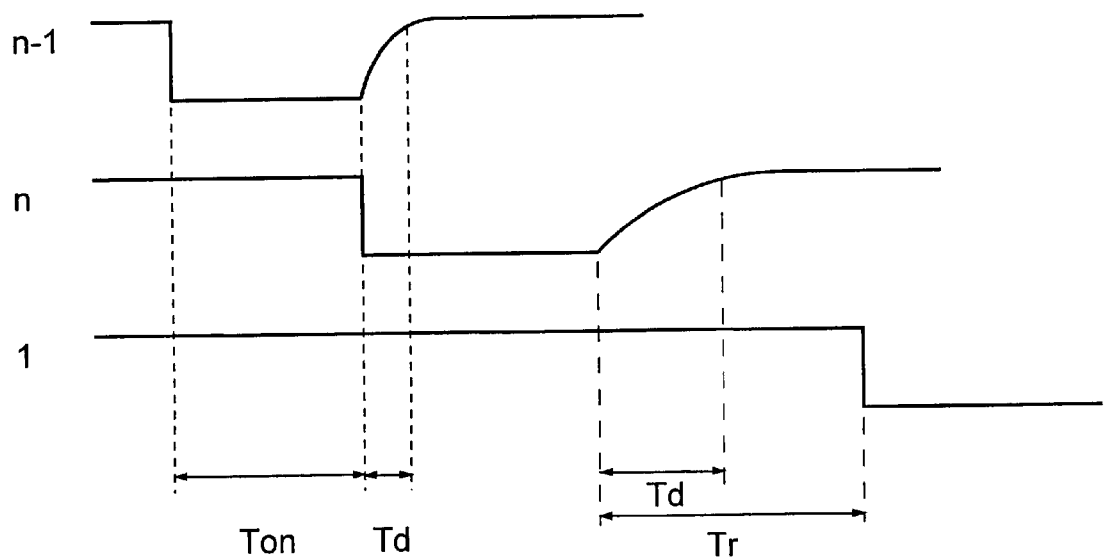
FIG. 2 is a timing chart illustrative of how the non-selection time or flyback time absorbs a delay time at the segment portion.

By the provision of the non-selection time Tr, the delay time Td at the segment portion is absorbed within the non-selection time Tr (flyback time), as shown typically in FIG. 2, and this makes it possible to prevent a contrast lowering and false light emission of the segment coexistent type display without recourse to any special preventive means and equipment.

The delay time Td at the matrix portion 31, and the segment portion 32 may be found from the resistance components R (e.g., pull-up resistance, switch on-resistance and interconnection resistance) in the circuit and the combined capacity comprising capacitor components C1, C2, C3, . . . that the organic EL device has. The value of the capacitor components increases with their area. Usually, it is preferable that the total area of the segment portion 32 corresponding to one scanning line, as calculated on a light emitting portion basis, is larger than the total area of each pixel corresponding to one scanning line on the matrix portion 31, as calculated on a light emitting portion basis. More preferably, the former should be at least 1.5 times, especially 2 to 20 times, as large as the latter. Too small an area ratio results in some considerable demerits such as a luminance drop due to flyback time and the driving of the dummy scanning line.

Usually, the capacitor components have a capacity of the order of 0.01 to 400 nF, especially 1 to 200 nF, throughout the segment portion, and the matrix portion has a capacity of the order of 0.01 to 100 nF, especially 1 to 20 nF, throughout the pixel corresponding to one scanning line. For such a range of capacitors, resistance of the order of 1 to $10^5$ Ω, especially $10^2$ to $10^4$ Ω is usually used. The delay time defined by these CR components is of the order of $10^{-2}$ to $10^2$ μs on the matrix side and $10^{-2}$ to $4 \times 10^3$ μs on the segment side. It is thus preferable that the non-selection time (flyback time or dummy scanning line driving time) Tr is of the order of $2 \times 10^{-2}$ to $4 \times 10^3$ μs, especially $10^{-1}$ to $10^3$ μs. By allowing the non-selection time Tr to have such a value, the delay time at the segment portion is absorbed within the non-selection time, resulting in prevention of false light emission.

When scanning lines other than the final scanning line are driven according to the present invention, the quiescent time may or may not be provided. To avoid a contrast lowering, the quiescent time corresponding to the delay time may be provided, although its control becomes complicated. Usually, the contrast ratio range permitted to obtain high-quality images is at least 100:1. If the contrast ratio has a value lower than that, it is unnecessary to provide the quiescent time.

The elements forming the driving system of the present invention are now explained in detail.

The display control means comprises a main control unit such as a host computer, an interface connectable to the main control unit, a control portion for analyzing commands from the main control unit and controlling its internal operation, a memory medium such a ROM for providing a given image pattern and operation procedures to the control portion, a main memory medium (RAM) for expanding various operations for computations, clock and gate elements for sending the scanning electrode driving signal (pulse) and data electrode driving signal (pulse), and various registers for determining flyback time, non-selection time, etc.

The display control means provides control such that when the scanning electrode and data electrode are driven, the non-selection time during which no data is displayed is provided after the segment portion is driven. The non-selection time may be defined by a time corresponding to the flyback time or a dedicated quiescent time. This may be appropriately determined depending on what form of display control means is used. When a conventional form of display control means is used, it is preferable that the non-selection time is defined by a flyback time after the final scanning line assigned to the segment portion is driven. When dedicated display control means is designed, it is preferable to provide the non-selection time after the segment portion is driven. Alternatively, the non-selection time may be defined by driving a plurality of driving lines as actually undriven dummy lines.

Each of the scanning electrode driving means 2a and data electrode driving means 2b is made up of semiconductor switching elements such as transistors and FETs, etc. These means are operable to amplify (power-convert) scanning electrode driving signals (pulses) and data electrode driving signals (pulses) from the display control means 1, thereby feeding the current necessary to drive the organic EL device.

The data electrode driving current is usually of the order of 0.001 to 100 mA, and preferably 0.01 to 50 mA.

The matrix portion comprises a plurality of scanning electrodes crossing over a plurality of data electrodes. With a driving signal given between two arbitrary electrodes of these electrodes, a specific pixel (an organic EL device) emits light. The number of scanning and data electrodes on the matrix portion may be appropriately determined depending on the size and definition of the display. Usually, however, the number of scanning electrodes is of the order of 1 to 768 and the number of data electrodes is of the order of 1 to 1,024.

The segment driving portion has a light emitting region having a relatively large area, where information such as images, characters and letters used in illumination, signal, indicator or other applications are to be displayed. In other words, the segment driving portion functions as a backlight for them or a light source that is of significance in itself.

Such displays with a mixed matrix-and-segment portion, for instance, are suitably used in the form of indicators for household electrical appliances such as microwave ovens, electric rice cookers, air conditioners, video equipment and audio equipment, various indicators for cars and bicycles such as speed meters, tachometers and navigation systems, and various measuring instruments for airplanes and control towers, etc.

It is acceptable to use an LCD controller for the display control means according to the present invention. The LCD controller used herein may be built up of an operation circuit comprising combined logic circuits, processors, memories such as RAMs and ROMs, etc., as mentioned above However, it is preferable to make use of an LCD controller IC, and an LCD controller driver IC (LSI), which are commercially available. By use of a commercially available IC, it is possible to save development costs and times and so develop products rapidly and at low costs.

Commercially available LCD controller ICs, for instance, include SED1351FoA and SED1353FoA made by Seiko Epson Co., Ltd., HD61830 made by Hitachi Ltd., MSM6255 made by Oki Electric Industry Co., Ltd. and LC7980 and LC7981 made by Sanyo Electric Co., Ltd. Commercially available LCD controller driver ICs, for instance, include μPD7225 and μPD7227 made by NEC Corporation and HD61602 and HD61603 made by Hitachi Ltd. for the segment drive type, μPD16435/A and μPD16676 made by NEC Corporation and MSM6222B-01 made by Oki Electric Industry Co., Ltd. for the matrix drive type, and μPD16432B made by NEC Corporation, MSM6665-01 made by Oki Electric Industry Co., Ltd. and HD66720 made by Hitachi Ltd. for the type of driving mixed segment-and-matrix panels.

Figure 3:
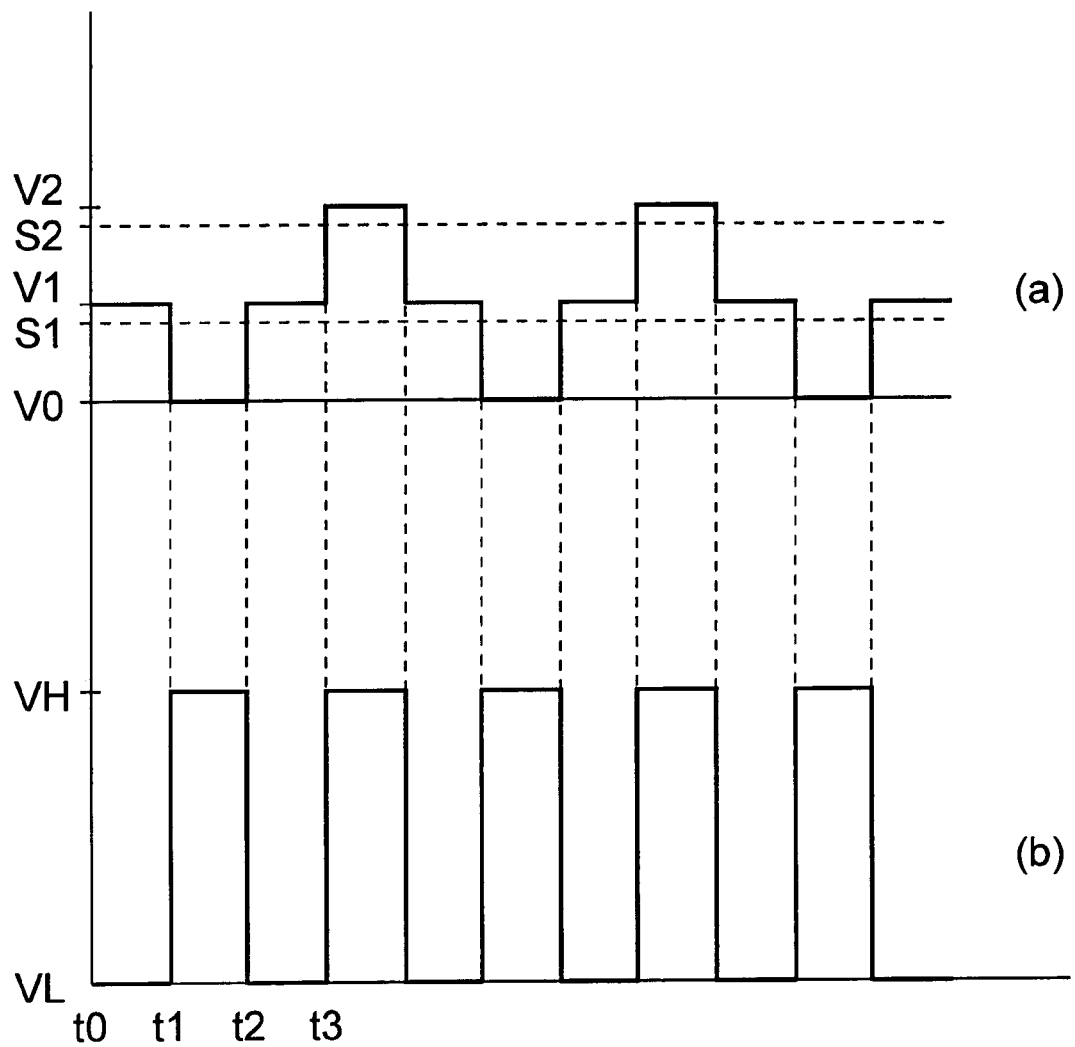
FIG. 3 is a timing chart illustrative of an output waveform of an LCD controller driver that can be used as display control means in the present invention and a driving waveform of an organic EL device.

The LCD controller driver produces a LCD driving pulse of two or more different signal levels necessary to drive the LCD. As shown in FIG. 3(*a*) for instance, this LCD driving pulse has a reference voltage V0 and a plurality of (two in the illustrated embodiment) signal levels V1 and V2, which are produced in the form of a combined pulse waveform of the respective levels. The period of the pulse waveform and the signal level may be arbitrarily determined depending on the LCD driving mode (e.g., ½, and ⅓ division mode) and the type of the display (e.g., matrix type, and segment type). Therefore, the organic EL display used herein may be selected from those equivalent or approximate to the type of LCD. While the pulse waveform is shown to be an assembly of rectangular waves in the illustrated embodiment, it is understood that the pulse waveform is not limited thereto. For instance, the pulse waveform may include a waveform that is expressed by an assembly of n-order sine waves and can provide a plurality of logic levels. Hereinafter, it is particularly assumed that the pulse waveform is neither deformed under influences of carrier paths, circuit constants, etc. nor affected by extraneous noises, etc.

Although such a driving pulse provides very effective means for driving the LCD, however, it is not practical for use with an organic EL display having a light emission luminance varying with current density, as can be seen from the illustrated embodiment wherein the luminance varies during the transition of time t2 to t3. It is thus difficult to use the LCD controller driver immediately as the organic EL display control means.

To avoid such difficulty, it is preferable to make use of signal conversion means for converting the LCD driving pulse to a signal for the organic EL device. The signal conversion means has one detection level or two or more different detection levels. Referring to FIG. 3(a) as an example, the signal conversion means has a plurality of detection levels S1 and S2 corresponding to a plurality of signal levels V1 and V2 of an LCD driving pulse produced from the LCD driving means, so that the organic EL device driving signal is produced depending on the state of signals detected at the plurality of detection levels S1 and S2. For the condition for the LCD driving pulse detected at the plurality of detection levels S1 and S2, either an H level (positive logic) or an L level (negative logic) may be used or, alternatively, either one of outputs upon detection may be reversed. One detection level, too, may be used. In this case, either one of the levels S1 and S2 illustrated is detected.

No particular limitation is imposed on the means for detecting the signal levels of the LCD driving pulse; an ordinary signal detection method suffices therefor. For instance, low detection voltage levels S1 and S2 allowing for some error range may be set with respect to a plurality of signal level voltages V1 and V2 for the LCD driving pulse, as illustrated, thereby producing outputs when signal voltages are or are not detected at the voltage levels. More exactly in the illustrated embodiment, the L level of LCD driving pulse is detected at the first detection level S1 and the H level of LCD driving pulse is detected at the second detection level S2 for conversion to the driving pulse for the organic EL display. Whether the signal is detected by positive or negative logic, and whether the output signal corresponding to the detected signal is positive or negative logic may be suitably determined depending on the type, etc. of the LCD driving means or organic EL display used. In a signal state for LCD display, usually, signal conversion takes place such that the organic EL display emits light. In the display state, however, the organic EL display may be driven in a time division mode.

The means for setting the detection level, too, is not particularly limited; use may be made of means for dividing source voltage, etc. by resistance, etc. to the reference voltage or means comprising an impedance element, a diode, a Zener diode, etc., in place of the resistance. Further, a voltage generation device such as a battery may be used or the detection level may be set in the form of digital data with respect to the signal upon A/D conversion.

The set detection level is compared with the LCD driving signal by comparison means where it is detected as a signal higher or lower than that. No particular limitation is imposed on the comparison means; use may be made of a comparator combined with an OP amplification IC, a modified differential amplifier, a processor for comparing an A/D converted signal with reference data, etc. Instead of using these means, the LCD driving pulse may be divided to a plurality of voltages, from which the signal level to be detected is taken and processed by a logic circuit or the like.

The organic EL display driving signal produced from the signal conversion means becomes an organic EL display driving signal in a single H (VH) or L (VL) level state suitable for driving the organic EL display (see FIG. 3(b)).

In response to the output signal of the signal conversion means, i.e., the organic EL display driving pulse, the scanning electrode driving means 2a and data electrode driving means 2b preferably used herein switch the connection of at least one electrode of the organic EL display from a power source side over to a ground side and vice versa. That is, if the electrode is connected to the ground side (power source side) during operation, it is connected to the power source side (ground side) during non-operation. By stabilizing the non-operation portion in this way, it is thus possible to prevent a defective portion, if any, in the organic layer, etc. on the matrix from causing current leakage with false light emission, because the scanning line side of that portion is kept at the H level (L level).

One possible means for the switching-over of connection to the electrode is to use a contacted device such as a relay. In consideration of high-speed and reliable operation, however, it is preferable to make use of transistors, FETs or semiconductor elements equivalent in function thereto. A plurality of (two or more) such semiconductor elements are connected and arranged corresponding to their conduction directions such that they are connected to either the power source or the ground side. When one semiconductor element is in operation (in a conducting state), the other is in non-operation (in a non-conducting state). For achieving such connection and arrangement, push-pull connection is generally known. It is here understood that the "power source side" and "ground side" include not only direct connection to the power source or ground line but also connection thereto via an element such as a current-limiting resistance and a protective diode.

The organic layers in the organic EL display used in the present invention are now explained.

The organic EL display used herein comprises a substrate, and a hole injecting electrode, a hole injecting and transporting layer, a combined light emitting and electron injecting/transporting layer and an electron injecting electrode stacked optionally with a protective layer on the substrate. This multilayered structure is reversed to sandwich organic layers between it and a sealing sheet.

The organic EL display according to the present invention is not limited to such an arrangement as mentioned above, and so may have various constructions. For instance, a single light emitting layer may be provided so that the electron injecting and transporting layer is interleaved between the light emitting layer and the electron injecting electrode. If required, the hole injecting and transporting layer may be mixed with the light emitting layer.

For the hole injecting electrode, it is preferable to use a transparent or translucent electrode because it is usually formed as the first electrode on the substrate side and constructed as an electrode out of which emitted light is taken. For the transparent electrode, ITO (tin-doped indium oxide), IZO (zinc-doped indium oxide), ZnO, $SnO_2$, $In_2O_3$ or the like may be used. However, ITO (tin-doped indium oxide) and IZO (zinc-doped indium oxide) are preferred. Usually, ITO contains $In_2O_3$ and SnO in stoichiometric composition; however, the amount of O may deviate slightly therefrom.

The hole injecting electrode should preferably have at least a certain thickness enough for injection of holes, and so is of preferably 10 to 500 nm, and more preferably 30 to 300 nm in thickness.

The hole injecting electrode layer may formed by an evaporation process or the like. However, preference is given to a sputtering process.

The electron injecting electrode is preferably formed of a material having a low work function such as K, Li, Na, Mg, La, Ce, Ca, Sr, Ba, Al, Ag, In, Sn, Zn and Zr each in a pure metal form. To improve the stability of the electron injecting electrode, it is also preferable to use a binary or ternary alloy system containing such metals. Alternatively, it is acceptable to use oxides and fluorides of alkaline metals. In this regard, the electron injecting electrode may be formed by an evaporation or sputtering process.

The electron injecting electrode thin film should preferably have at least a certain thickness enough for injection of electrons; it has a thickness of 0.1 nm or more, and preferably 1 nm or more. Although there is no upper limit to the thickness, it is usually preferable that the upper thickness is of the order of 1 to 500 nm. The electron injecting electrode may be provided thereon with a protective electrode.

After the formation of the electrode film, a protective film formed of an inorganic material such as SiOx or an organic material such as Teflon or a chlorine-containing carbon fluoride polymer may be provided in addition to the aforesaid protective electrode. The protective film may be transparent or opaque, and has a thickness of the order of 50 to 1,200 nm. The protective film may be formed not only by the aforesaid reactive sputtering process but also by an ordinary sputtering process, an evaporation process, a PECVD process or the like.

Preferably, the device is sealed up by means of a sealing sheet for the purpose of preventing oxidation of the organic layers and electrodes in the device. To prevent penetration of moisture, the sealing sheet is bonded to the device using an adhesive resin layer to seal up the device. An inert gas such as Ar, He and $N_2$ is preferably used as a sealing gas.

The substrate material is not particularly critical to the present invention, and so may be suitably determined depending on the electrode material of the organic EL structure stacked on the substrate. For instance, use may be made of metal materials such as Al, and transparent or translucent materials such as glass, quartz and resin. The substrate may also be formed of an opaque material. For instance, use may be made of a ceramic sheet such as an alumina sheet or a metal sheet such as a stainless sheet which has been oxidized or otherwise processed on its surface, thermosetting resins such as phenol resin, and thermoplastic resins such as polycarbonate.

The organic material layers provided on the organic EL device are now explained.

The light emitting layer has functions of injecting holes and electrons, transporting them, and recombining holes and electrons to create excitons. For the light emitting layer, it is preferable to use a relatively electronically neutral compound.

The hole injecting and transporting layer has functions of facilitating injection of holes from the hole injecting electrode, providing stable transportation of holes and blocking electrons. The electron injecting and transporting layer has functions of facilitating injection of electrons from the electron injecting and transporting layer, providing stable transportation of electrons and blocking holes. These layers are effective for increasing the number of holes and electrons injected into the light emitting layer and confining holes and electrons therein for optimizing the recombination region to improve light emission efficiency.

No particular limitation is imposed on the thickness of the light emitting layer, the thickness of the hole injecting and transporting layer, and the thickness of the electron injecting and transporting layer. However, these layers should preferably a thickness of the order of usually 5 to 500 nm, and especially 10 to 300 nm although varying depending on formation processes.

The thicknesses of the hole injecting and transporting layer, and the electron injecting and transporting layer are approximately equal to, or range from about 1/10 times to about 10 times as large as, the thickness of the light emitting layer although they depend on the design of the recombination/light emitting region. When the hole or electron injecting and transporting layer is separated into an injecting layer and a transporting layer, it is preferable that the injecting layer is at least 1 nm thick and the transporting layer is at least 1 nm thick. The upper limit to the thickness is usually about 500 nm for the injecting layer and about 500 nm for the transporting layer. The same film thickness is also true of the case where two injecting and transporting layers are provided.

In the organic EL device according to the present invention, the light emitting layer contains a fluorescent material that is a compound capable of emitting light. The fluorescent material used herein, for instance, may be at least one compound selected from compounds such as those disclosed in JP-A 63-264692, e.g., quinacridone, rubrene, and styryl dyes. Use may also be made of quinoline derivatives such as metal complex dyes containing 8-quinolinol or its derivative as ligands, for instance, tris(8-quinolinolato) aluminum, tetraphenylbutadiene, anthracene, perylene, coronene, and 12-phthaloperinone derivatives. Use may further be made of phenylanthracene derivatives disclosed in JP-A 8-12600 (Japanese Patent Application No. 6-110569) and tetraarylethene derivatives disclosed in JP-A 8-12969 (Japanese Patent Application No. 6-114456).

Preferably, the fluorescent compound is used in combination with a host substance capable of emitting light by itself; that is, it is preferable that the fluorescent compound is used as a dopant. In such a case, the content of the fluorescent compound in the light emitting layer is in the range of preferably 0.01 to 10% by weight, and especially 0.1 to 5% by weight. By using the fluorescent compound in combination with the host substance, it is possible to vary the wavelength performance of light emission of the host substance, thereby making light emission possible on a longer wavelength side and, hence, improving the light emission efficiency and stability of the device.

Quinolinolato complexes, and aluminum complexes containing 8-quinolinol or its derivatives as ligands are preferred for the host substance. Such aluminum complexes are typically disclosed in JP-A's 63-264692, 3-255190, 5-70733, 5-258859, 6-215874, etc.

Exemplary aluminum complexes include tris(8-quinolinolato)aluminum, bis(8-quinolinolato)magnesium, bis(benzo{f}-8-quinolinolato)zinc, bis(2-methyl-8-quinolinolato)aluminum oxide, tris(8-quinolinolato)indium, tris(5-methyl-8-quinolinolato)aluminum, 8-quinolinolato-lithium, tris(5-chloro-8-quinolinolato)gallium, bis(5-chloro-8-quinolinolato)calcium, 5,7-dichloro-8-quinolinolato-aluminum, tris(5,7-dibromo-8-hydroxyquinolinolato) aluminum, and poly[zinc(II)-bis(8-hydroxy-5-quinolinyl) methane].

Use may also be made of aluminum complexes having other ligands in addition to 8-quinolinol or its derivative.

Other preferable host substances include phenylanthracene derivatives disclosed in JP-A 8-12600 (Japanese Patent Application No. 6-110569), tetraarylethene derivatives disclosed in JP-A 8-12969 (Japanese Patent Application No. 6-114456), etc.

In the practice of the present invention, the light emitting layer may also serve as an electron injecting and transporting layer. In this case, it is preferable to use a fluorescent material, e.g., tris(8-quinolinolato)aluminum or the like, which may be provided by evaporation.

If necessary or preferably, the light emitting layer is formed of a mixed layer of at least one compound capable of injecting and transporting holes with at least one compound capable of injecting and transporting electrons. Preferably in this case, a dopant is incorporated in the mixed layer. The content of the dopant compound in the mixed layer is in the range of preferably 0.01 to 20% by weight, and especially 0.1 to 15% by weight.

In the mixed layer with a hopping conduction path available for carriers, each carrier migrates in the polarly prevailing substance, so making the injection of carriers having an opposite polarity unlikely to occur. This leads to an increase in the service life of the device due to less damage to the organic compound. By incorporating the aforesaid dopant in such a mixed layer, it is possible to vary the wavelength performance of light emission that the mixed layer itself possesses, thereby shifting the wavelength of light emission to a longer wavelength side and improving the intensity of light emission, and the stability of the device as well.

The compound capable of injecting and transporting holes and the compound capable of injecting and transporting electrons, both used to form the mixed layer, may be selected from compounds for the injection and transportation of holes and compounds for the injection and transportation of electrons, as will be described later. Especially for the compounds for the injection and transportation of holes, it is preferable to use amine derivatives having strong fluorescence, for instance, hole transporting materials such as triphenyldiamine derivatives, styrylamine derivatives, and amine derivatives having an aromatic fused ring.

For the compounds capable of injecting and transporting electrons, it is preferable to use metal complexes containing quinoline derivatives, especially 8-quinolinol or its derivatives as ligands, in particular, tris(8-quinolinolato)aluminum ($Alq^3$). It is also preferable to use the aforesaid phenylanthracene derivatives, and tetraarylethene derivatives.

In this case, the ratio of mixing the compound capable of injecting and transporting holes with respect to the compound capable of injecting and transporting electrons is determined while the carrier mobility and carrier density are taken into consideration. In general, however, it is preferred that the weight ratio between the compound capable of injecting and transporting holes and the compound capable of injecting and transporting electrons is of the order of 1/99 to 99/1, particularly 10/90 to 90/10, and more particularly 20/80 to 80/20.

The thickness of the mixed layer should preferably be equal to or larger than the thickness of a single molecular layer, and less than the thickness of the organic compound layer. More specifically, the mixed layer has a thickness of preferably 1 to 100 nm, more preferably 5 to 60 nm, and even more preferably 5 to 50 nm.

Preferably, the mixed layer is formed by co-evaporation where the selected compounds are evaporated from different evaporation sources. When the compounds to be mixed have identical or slightly different vapor pressures (evaporation temperatures), however, they may have previously been mixed together in the same evaporation board for the subsequent evaporation. Preferably, the compounds are uniformly mixed together in the mixed layer. However, the compounds in an archipelagic form may be present in the mixed layer. The light emitting layer may generally be formed at a given thickness by the evaporation of the organic fluorescent substance or coating a dispersion of the organic fluorescent substance in a resin binder.

For the hole injecting and transporting layer, use may be made of various organic compounds as disclosed in JP-A's 63-295695, 2-191694, 3-792, 5-234681, 5-239455, 5-299174, 7-126225, 7-126226 and 8-100172 and EP 0650955A1. Examples are tetraarylbenzidine compounds (triaryldiamine or triphenyl-diamine (TPD)), aromatic tertiary amines, hydrazone derivatives, carbazole derivatives, triazole derivatives, imidazole derivatives, oxadiazole derivatives having an amino group, and polythiophenes. The compounds may be used singly or in combination of two or more. Where two or more such compounds are used, they may be stacked as separate layers, or otherwise mixed.

When the hole injecting and transporting layer is provided as a separate hole injecting layer and a separate hole transporting layer, two or more compounds are selected in a preferable combination from the compounds already mentioned for the hole injecting and transporting layer. In this regard, it is preferable to laminate layers in such an order that a compound layer having a lower ionization potential is disposed contiguous to the hole injecting electrode (ITO, etc.). It is also preferable to use a compound having good thin-film formation capability at the surface of the hole injecting electrode. This order of lamination holds for the provision of two or more hole injecting and transporting layers, and is effective as well for lowering driving voltage and preventing the occurrence of current leakage and the appearance and growth of dark spots. Since deposition by evaporation is utilized for device fabrication, films as thin as about 1 to 10 nm can be formed in a uniform and pinhole-free state, which restrains any change in color tone of emitted light and a drop of efficiency by re-absorption even if a compound having a low ionization potential and absorption in the visible range is used in the hole injecting layer. The hole injecting and transporting layer may be formed by the evaporation of the aforesaid compound as is the case with the light emitting layer.

For the electron transporting layer which is provided if necessary, there may be used quinoline derivatives such as organic metal complexes containing 8-quinolinol or its derivatives as ligands, for instance, tris(8-quinolinolato) aluminum ($Alq^3$), oxadiazole derivatives, perylene derivatives, pyridine derivatives, pyrimidine derivatives, quinoxaline derivative, diphenylquinone derivatives, and nitro-substituted fluorene derivatives. The electron injecting and transporting layer may also serve as a light emitting layer. In this case, it is preferable to use tris(8-quinolilato) aluminum, etc. The electron transporting layer may be formed as by evaporation, as is the case with the light emitting layer.

When the electron injecting and transporting layer is provided as a separate hole injecting layer and a separate hole transporting layer, two or more compounds are selected in a preferable combination from the compounds already mentioned for the electron injecting and transporting layer. In this regard, it is preferable to laminate layers in such an order that a compound layer having a larger electron affinity is disposed contiguous to the electron injecting electrode. This order of lamination holds for the provision of two or more electron injecting and transporting layers.

Of the aforesaid organic layers, the hole injecting and transporting layer, electron injecting and transporting layer, etc. may be formed of an inorganic material.

The substrate may be provided with a color filter film, fluorescent material-containing color conversion film or dielectric reflecting film for controlling the color of light emission.

For the color filter film, a color filter employed with liquid crystal display devices, etc. may be used. However, it is preferable to control the properties of the color filter in conformity to the light emitted from the organic EL device, thereby optimizing the efficiency of taking out light emission and color purity.

By using a color filter capable of cutting off extraneous light of such short wavelength as absorbed by the EL device material or the fluorescent conversion layer, it is possible to improve the light resistance of the device and the contrast of what is displayed on the device.

Instead of the color filter, an optical thin film such as a dielectric multilayer film may be used.

The fluorescent color conversion film absorbs light emitted from an EL device and gives out light from the fluorescent material contained therein for the color conversion of light emission, and is composed of three components, a binder, a fluorescent material and a light absorbing material.

In the practice of the invention, it is basically preferable to use a fluorescent material having high fluorescent quantum efficiency, and especially a fluorescent material having strong absorption in an EL light emission wavelength region. Laser dyes are suitable for the practice of the invention. To this end, for instance, it is preferable to use rohodamine compounds, perylene compounds, cyanine compounds, phthalocyanine compounds (including subphthalocyanine compounds, etc.), naphthaloimide compounds, fused cyclic hydrocarbon compounds, fused heterocyclic compounds, styryl compounds, and coumarin compounds.

For the binder, it is basically preferable to make an appropriate selection from materials that do not extinguish fluorescence. It is particularly preferable to use a material that can be finely patterned by photolithography, printing or the like. It is also preferable to use a material that is not damaged during ITO or IZO film formation.

The light absorbing material is used when light is not fully absorbed by the fluorescent material, and so may be dispensed with, if not required. For the light absorbing material, it is preferable to make a selection from materials that do not extinguish fluorescence.

Preferably, the hole injecting and transporting layer, the light emitting layer, and the electron injecting and transporting layer are formed by a vacuum evaporation process because a uniform thin film can then be obtained. With the vacuum evaporation process, it is thus possible to obtain a uniform thin film in an amorphous state or with a grain size of up to 0.2 $\mu$m. A grain size of greater than 0.2 $\mu$m results in non-uniform light emission. To avoid this, it is required to make the driving voltage of the device high. However, this in turn gives rise to some considerable drop of charge injection efficiency.

No particular limitation is imposed on conditions for vacuum evaporation. However, the vacuum evaporation should preferably be carried out at a degree of vacuum of up to $10^{-4}$ Pa and a deposition rate of about 0.01 to 1 nm/sec. Also, the layers should preferably be continuously formed in vacuum, partly because the deposition of impurities on the interface between adjacent layers is avoidable resulting in the achievement of high performance, and partly because the driving voltage of the device can be lowered with elimination of dark spots or no growth of dark spots.

When the layers, each containing a plurality of compounds, are formed by the vacuum evaporation process, it is preferable that co-evaporation is carried out while each board with the compounds charged therein is placed under temperature control.

The organic EL device of the invention is generally of the DC drive type while it may be of the AC or pulse drive type. The applied voltage is usually of the order of 2 to 30 volts.

EXAMPLE

The present invention is explained more specifically with reference to an example.

Figure 4:
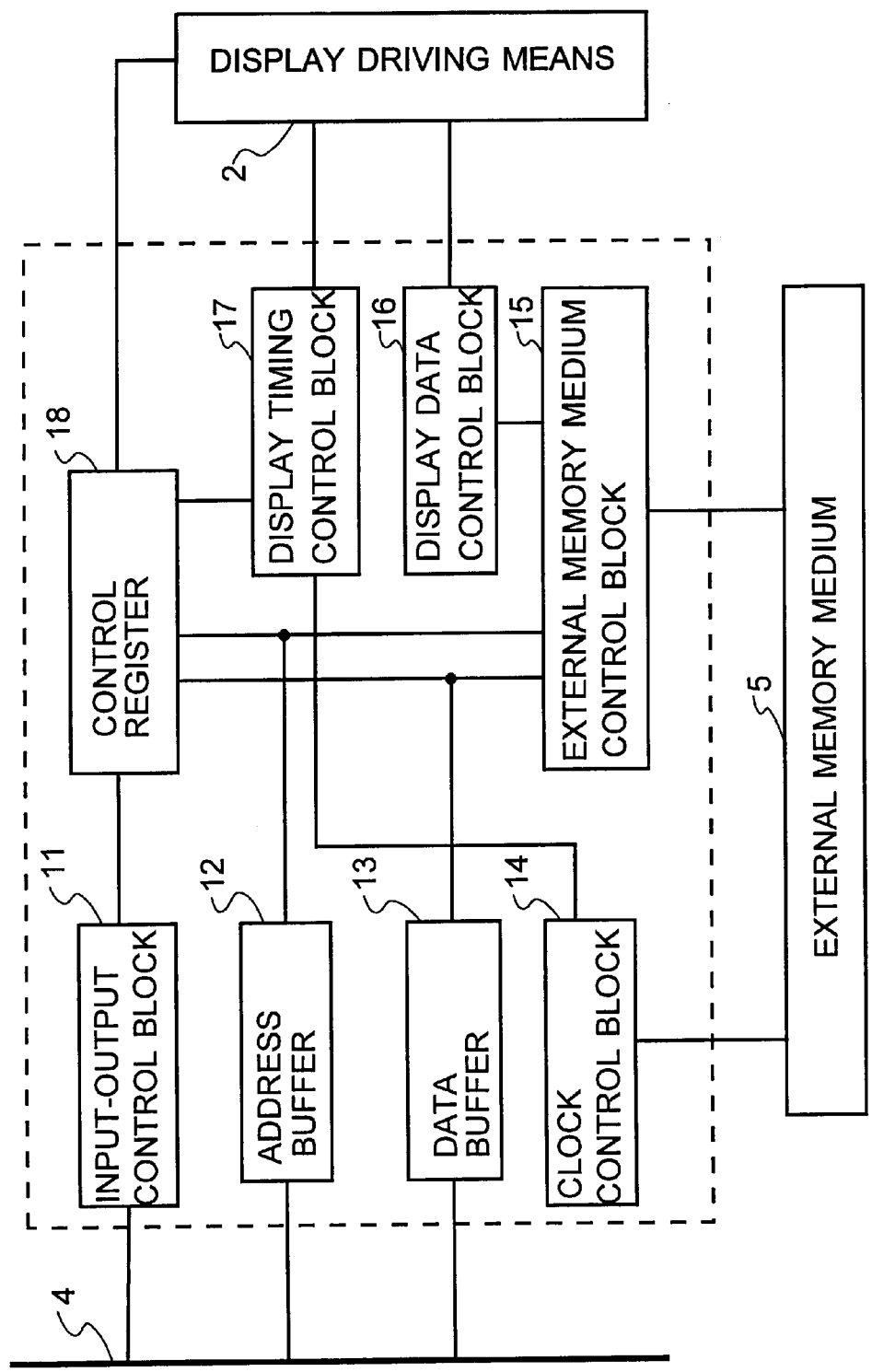
FIG. 4 is a block diagram illustrative of one exemplary arrangement of the display control means according to the present invention.
Figure 5:
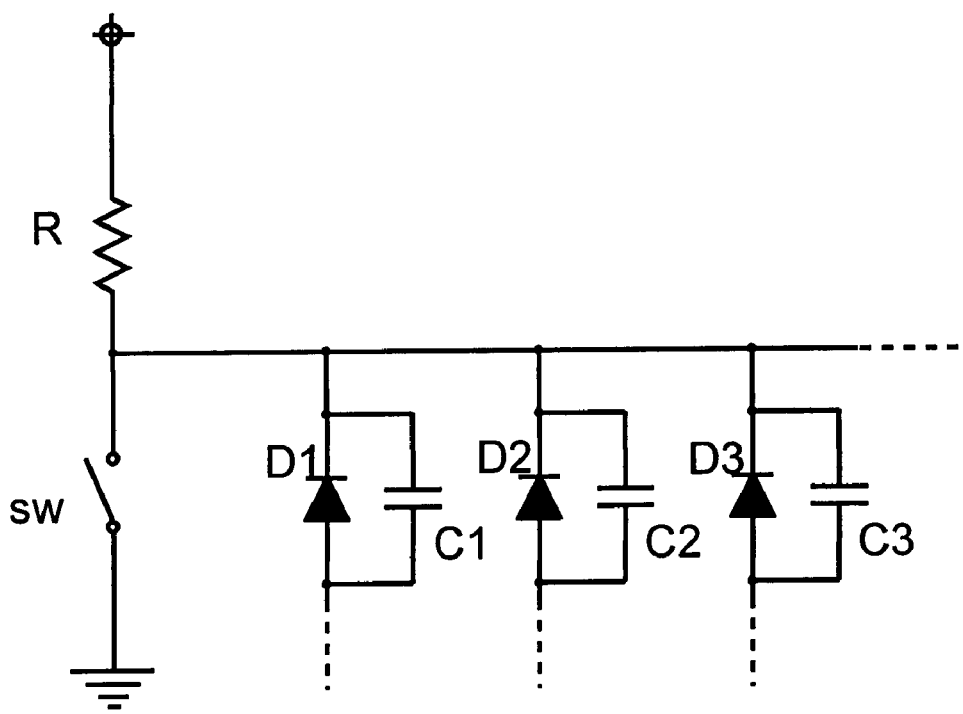
FIG. 5 is an equivalent circuit diagram illustrative of an equivalent circuit on one scanning line on a matrix type display.
Figure 6:
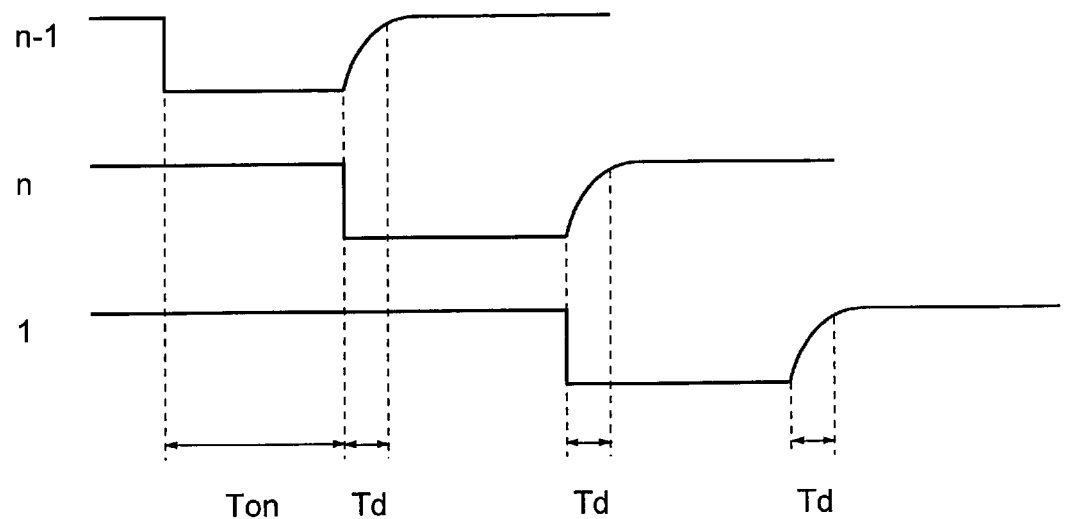
FIG. 6 is a timing chart illustrative of a dynamic driving waveform of a display having a delay time.
Figure 7:
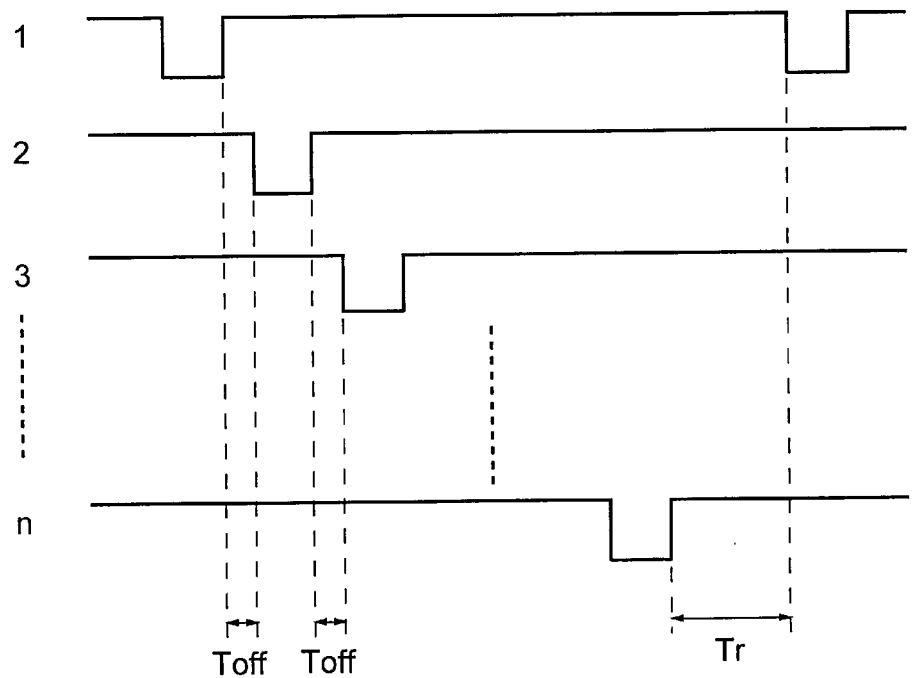
FIG. 7 is a timing chart illustrative of how a quiescent time is added to a driving pulse of an organic EL device.
Figure 8:
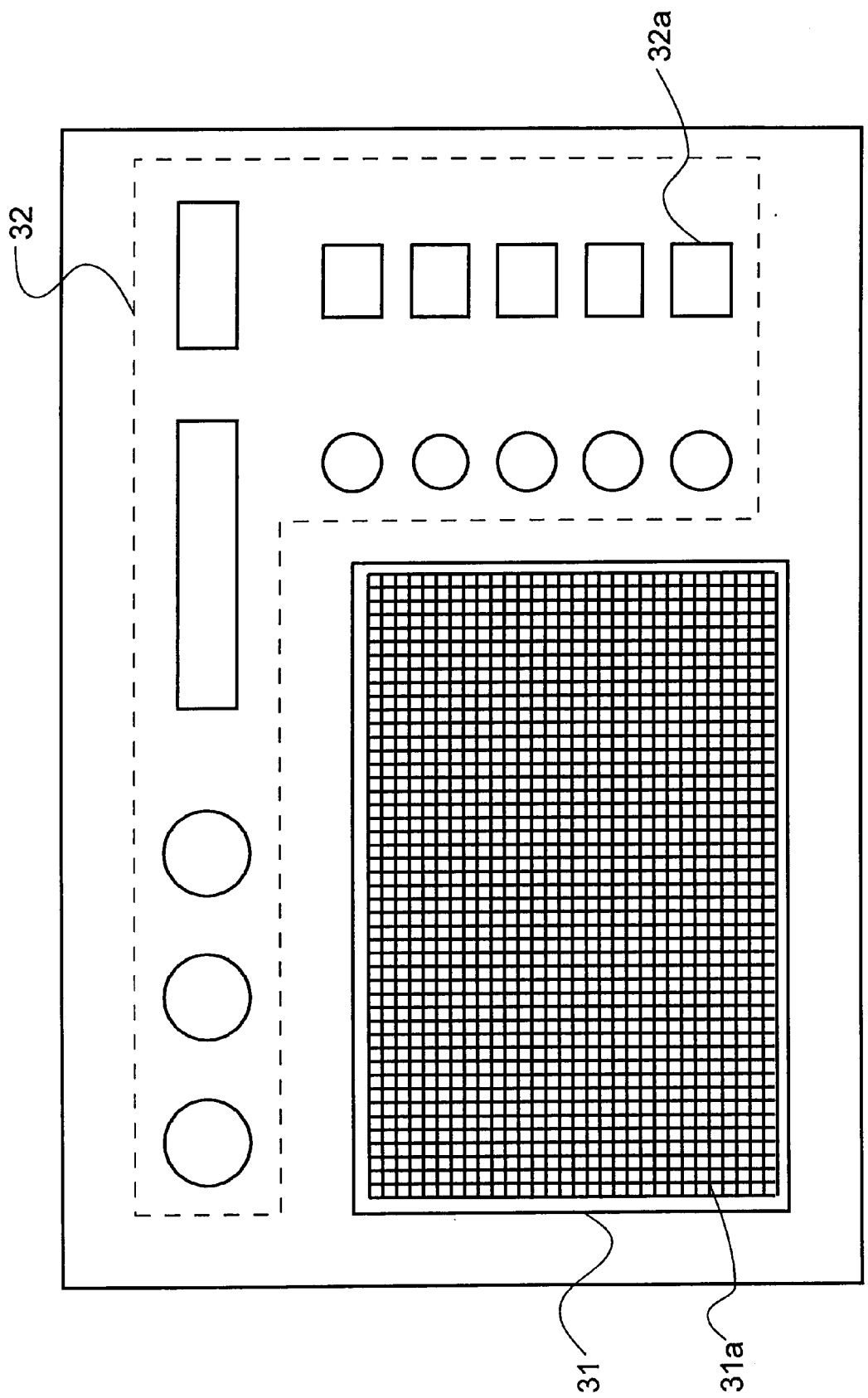
FIG. 8 is a schematic view illustrative of one embodiment of a display having a mixed matrix-and-segment portion.
Figure 9:
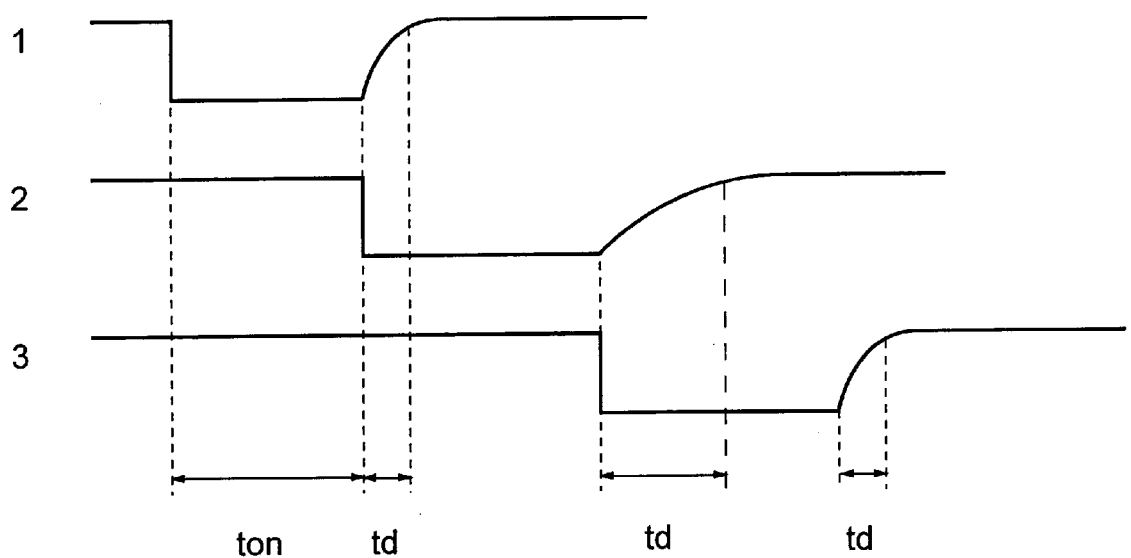
FIG. 9 is a timing chart illustrative of how a delay time at the segment portion relates to the timing of driving the next scanning line.

The display control means 1 (see FIG. 1) shown in FIG. 4 comprises an input-output block 11 for receiving input-output control signals via an external bus 4 connected to a host computer (not shown), an address buffer 12 for receiving an address signal and a data buffer 13 for receiving a data signal.

The input-output control block 11, address buffer 12 and data buffer 13 are connected to a control register 18 that provides various settings and control of each part according to what is set. The address buffer 12 and data buffer 13 are connected to an external memory medium control block 15, through which displayed images, etc. are temporarily stored in an external memory medium 5, and given image information stored in the external memory medium 5 is displayed. It is here noted that the external memory medium 5 is connected to a clock control block 15 for providing thereto refresh signals, the signals required for synchronization with the display control means 1, etc.

The external memory medium control block 15 is connected to a display data control block 16 to send the data to be displayed on a monitor, i.e., data signals to the display driving means 2. A display timing control block 17 is connected to the control register 18 and clock control block 14 to send display timing, i.e., scanning signals, clock signals for display data, etc. to the display driving means 2.

Enabling signals, etc. are sent from the control register 18 to the display driving means 2, so that the whole operation of the display driving means 2 can be controlled. As shown in FIG. 1 as an example, the display driving means 2 comprises scanning electrode driving means 2a and data electrode driving means 2b, so that matrix and segment portions 31 and 32 can be driven.

According to the thus constructed display control means 1, the number of scanning electrodes (vertical lines) can be set or otherwise controlled by the control register 18. In this example, the vertical flyback time is defined by the control register 18 as being a time corresponding to two vertical lines, so that the first vertical line (scanning electrode) can be again driven after the lapse of a given time upon the final vertical line (scanning electrode) driven. By driving the segment portion 32 at a time corresponding to the final vertical line, it is thus possible to automatically make effective use of the time corresponding to the vertical flyback time as the non-selection time, i.e., the quiescent time.

If the number of vertical lines set by the control register 18 is larger than actually required, it is then possible to make effective use of the time for driving the actually absent vertical lines as the non-selection time, i.e., the quiescent time. It is thus possible to set the quiescent time with some degree of freedom, and so make it unnecessary to fix the vertical line, for which the quiescent time is required, to the final driving line, resulting in an increase in the degree of freedom in design. In this case, the vertical flyback time may or may not exist.

The non-selection time control function may be added to the control register or a control unit equivalent in function thereto. In this case, it is difficult to take advantage of an existing IC, etc. because of the need of a unique arrangement. However, more efficient display control means is achievable because a design suitable for system can be made. Conveniently in this case, registers or commands for selecting or setting the non-selection time or a driving line having a non-selection time are provided. Even with controller ICs incapable of setting the number of scanning lines arbitrarily, no problem arises if an IC capable of driving the actually driven scanning lines plus dummy scanning lines is selected from such ICs.

According to the present invention as explained above, it is possible to provide an organic EL display driving system which enables even a display with a mixed matrix-and-segment portion to be driven with neither a contrast lowering nor false light emission yet in simple construction.

What we claim is:

1. A system for driving an organic EL display with a mixed matrix-and-segment portion, which comprises an organic material-containing organic layer between a scanning electrode and a data electrode, wherein:

when said scanning electrode and said data electrode are driven, a non-selection time during which no data is displayed is provided after driving said segment portion.

2. The system for driving an organic EL display according to claim 1, wherein at least one of driving lines on said segment portion is driven while connected to a final driving line on said scanning electrode and said non-selection time is provided after driving said segment portion.

3. The system for driving an organic EL display according to claim 1, wherein the total area of said segment portion is larger than the total area of a pixel corresponding to one scanning line on said scanning electrode on said matrix portion.

4. The system for driving an organic EL display according to claim 2, wherein the total area of said segment portion is larger than the total area of a pixel corresponding to one scanning line on said scanning electrode on said matrix portion.

5. A method for driving an organic EL display with a mixed matrix-and-segment portion, which comprises an organic material-containing organic layer between a scanning electrode and a data electrode, wherein:

when said scanning electrode and said data electrode are driven, a non-selection time during which no data is displayed is provided after driving said segment portion.

6. The method for driving an organic EL display according to claim 5, wherein said segment portion corresponding to one scanning line on said scanning electrode is driven while connected to a final driving line on said scanning electrode and said non-selection time is provided after driving said final driving line.

* * * * *

UNITED STATES PATENT AND TRADEMARK OFFICE
CERTIFICATE OF CORRECTION

PATENT NO. : 6,208,083 B1
DATED : March 27, 2001
INVENTOR(S) : Mitsunari Suzuki et al.

It is certified that error appears in the above-identified patent and that said Letters Patent is hereby corrected as shown below:

<u>Title page,</u>
The Related U.S. Application Data has been omitted. It should read as follows:

-- Related U.S. Application Data

[63]    Continuation of PCT/JP99/04836, filed Sept. 7, 1999. --

<u>Column 1,</u>
After the title, insert:

-- This application is a Continuation of International PCT Application No:
   PCT/JP99/04836, filed on September 7, 1999. --

Signed and Sealed this

Eighteenth Day of June, 2002

*Attest:*

JAMES E. ROGAN
*Attesting Officer*    *Director of the United States Patent and Trademark Office*